2 Sheets—Sheet 1.

J. TAYLOR & J. OUTTERSON.

Process for Manufacture of Paper-Pulp from Wood.

No. 8,877. Reissued Sept. 2, 1879.

Witnesses:

P. L. Dietrich,

Jno. A. Stockman.

Inventors:

James Taylor

James J. Outterson.

Per C. H. Walson & Co. Attorneys.

J. TAYLOR & J. OUTTERSON.

Process for Manufacture of Paper-Pulp from Wood.

No. 8,877. Reissued Sept. 2, 1879.

Witnesses:

P. C. Dieterich

Jno. A. Stockman

Inventors

James Taylor

James T. Outterson

Per C. H. Walcott & Co., Attorneys.

UNITED STATES PATENT OFFICE.

JAMES TAYLOR, OF LUZERNE, AND JAMES T. OUTTERSON, OF PALMER FALLS, NEW YORK.

IMPROVEMENT IN PROCESSES FOR MANUFACTURE OF PAPER-PULP FROM WOOD.

Specification forming part of Letters Patent No. 191,899, dated June 12, 1877; Reissue No. 8,877, dated September 2, 1879; application filed June 28, 1879.

*To all whom it may concern:*

Be it known that we, JAMES TAYLOR, of Luzerne, in the county of Warren, and JAMES T. OUTTERSON, of Palmer Falls, in the county of Saratoga and State of New York, have invented certain new and useful Improvements in Processes for Manufacture of Paper-Pulp from Wood; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Our invention relates to processes for making or preparing wood-pulp.

One of the objects of our invention in the process of making the pulp is to provide a method for producing a greater amount of pulp in a given time without consuming as much power as heretofore.

Our improvement consists in cutting the wood crosswise, or nearly so, of the grain, and then treating it as hereinafter more fully described, and pointed out in the claims.

In the annexed drawings we have represented machinery by which our process may be carried out.

Figure 1:
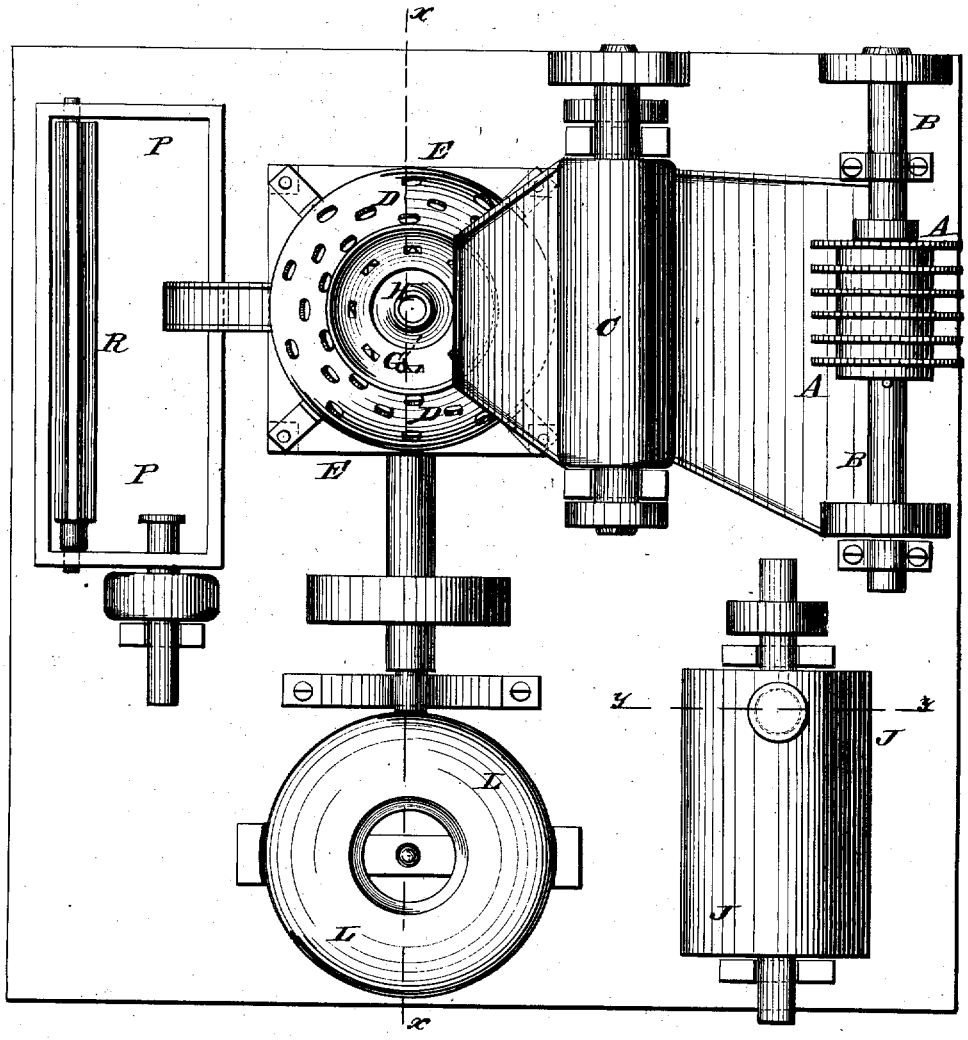
Figure 2:
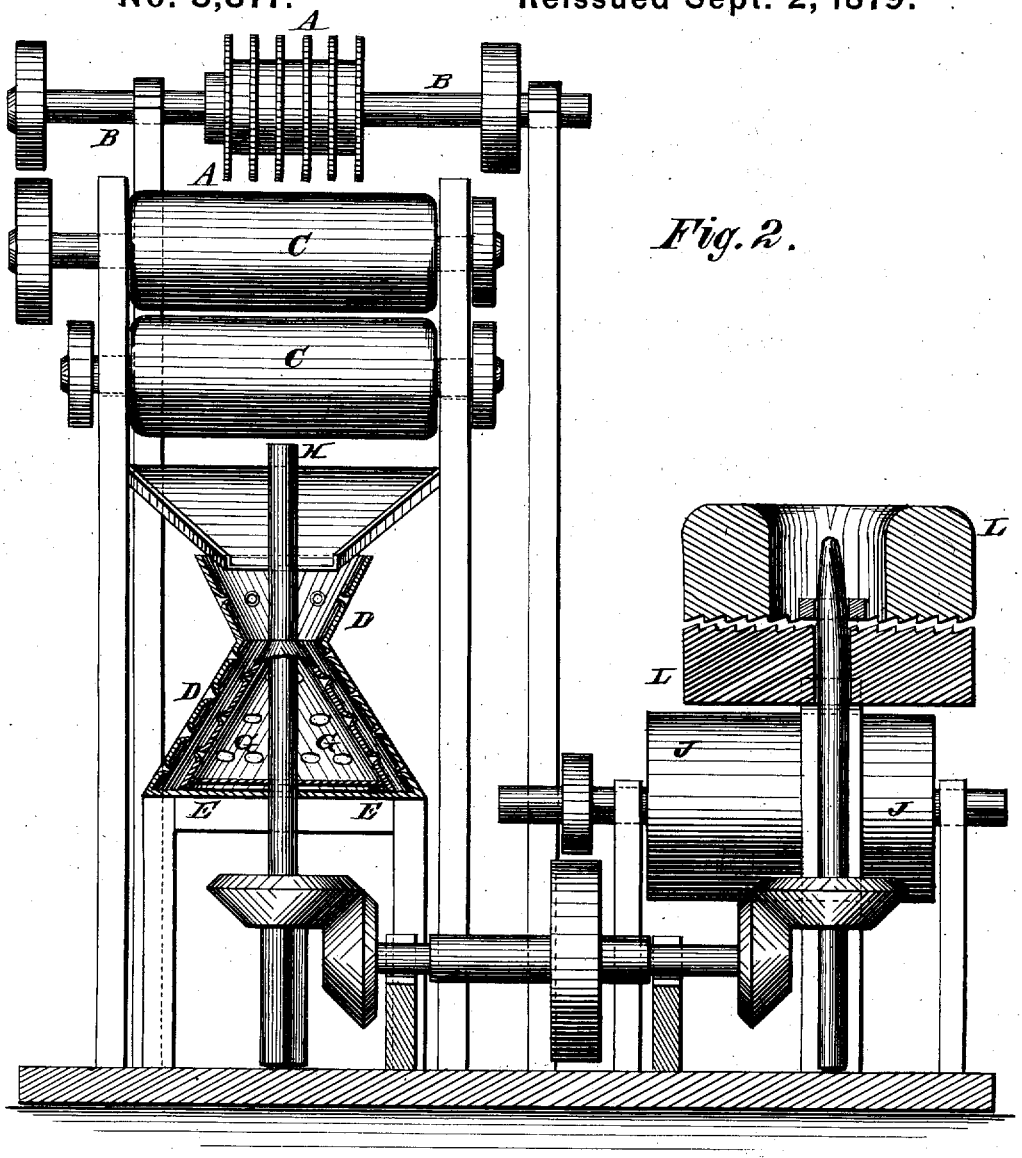
Figure 3:
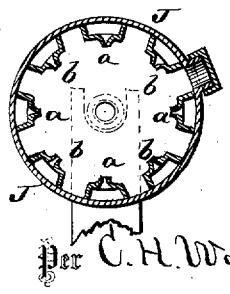

Figure 1 represents a plan view of such machinery. Figs. 2 and 3 are sections on the lines *x x* and *y y* of Fig. 1.

A A represent a gang of saws mounted upon a horizontal shaft, B, having its bearings in a suitable frame or standards, as shown. These saws are arranged for cutting off wood crosswise, or nearly so, of the grain of the wood.

If desired, but one saw may be used with good results, although in the drawings we have illustrated several.

The pieces of wood thus cut by the saw or saws are fed to one or more sets of rollers, C C, for crushing the wood endwise of the grain of the wood. These rollers should be adjusted to receive wood one-fourth of an inch long, and should be adjustable to any length the fiber may be required for the manufacture of paper for printing, or for bags or belting, or any other fabric where a long fiber is required.

The wood may be pounded endwise of the grain of the wood, or it may be crushed by an eccentric or any other mode of crushing, and produce the same result—that is, to crush the wood endwise of the grain to separate the fibers by any mode of crushing, rolling, or breaking the fibers endwise of the grain of the wood.

When thus manipulated, the wood is fed into a conical picker for separating the fibers. This picker consists of a horizontally or vertically arranged stationary conical shell, D, which is roughened on the inside and fastened on a bottom plate, E, and an interior cone, G, roughened on the outside, and secured on a shaft, H, which may be adjusted in order to adjust the cone with relation to the surrounding shell D, so as to pick the fibers fine or coarse, as may be required for the manufacture of belting, bagging, or any other fabric.

The wood is now put into a rotating boiler, J, under a pressure of about fifty pounds to the square inch, to facilitate the separation of the fibers. This process also colors the fibers for Manila paper.

The boiler is provided with interior longitudinal strips, *b*, beveled on both sides or edges, and formed with roughened projections or teeth *a*, to separate the fibers thoroughly. The wood, after it is sawed off, may be rolled and run into the picker with the sawdust mixed with water, and from the picker run through millstones L L for pulp for the manufacture of white paper. At this stage it is run into a vat, P, and taken off from said vat with a belt, and squeezed between two rollers to relieve it of part of the water for transportation.

Equally good results may, however, be attained by introducing the wood into the rotary boiler just after it has passed through the crusher; or it may be sawed or cut into suitable lengths and steamed before subjecting it to the action of the crusher; or it may be steamed before it is cut into lengths suitable for the object in view.

The various rotating parts of the machine may be geared together by belts, cog-wheels, friction-wheels, or other devices suitably arranged to accomplish the desired object.

Within the vat P is a suitable revolving agitator, R, also run by the gearing that operates the other running parts of the machine.

By our process we produce a better article in a cheaper and more expeditious manner than heretofore, and by one that is better adapted for the purpose of making paper of any desired quality.

We are aware that in the manufacture of paper-pulp from wood it is not new separately to cut up the wood in small blocks, nor to crush wood, nor to pick, grind, or disintegrate the same; and we do not claim such steps, broadly.

Our claim is for an entire process consisting of the three steps or stages, in the order named, which have not been heretofore employed in the same manner.

Having thus fully described our invention, what we claim, and desire to secure by Letters Patent, is—

1. The process of preparing wood for paper-pulp by cutting the wood crosswise of the grain, then crushing the cut wood, and finally picking, disintegrating, or grinding the crushed wood, substantially as set forth.

2. The process for preparing wood-pulp, consisting, essentially, in cutting the wood crosswise of the grain, crushing it endwise of the grain, then picking it, and then subjecting it to the action of steam-pressure, substantially as herein set forth.

In testimony that we claim the foregoing we have hereunto set our hands this 20th day of June, 1879.

JAMES TAYLOR.
J. T. OUTTERSON.

Witnesses:
J. M. WHITMAN,
A. D. ARNOLD.